(12) United States Patent
Schick

(10) Patent No.: US 10,684,701 B1
(45) Date of Patent: Jun. 16, 2020

(54) TAP DEVICE WITH MULTI-TAP FEATURE FOR EXPANDED CHARACTER SET

(71) Applicant: TAP SYSTEMS INC., Los Angeles, CA (US)

(72) Inventor: David B. Schick, Los Angeles, CA (US)

(73) Assignee: Tap Systems Inc., Los Angeles, CA (US)

( * ) Notice: Subject to any disclaimer, the term of this patent is extended or adjusted under 35 U.S.C. 154(b) by 0 days.

(21) Appl. No.: 15/964,764

(22) Filed: Apr. 27, 2018

Related U.S. Application Data (60) Provisional application No. 62/490,873, filed on Apr. 27, 2017.

(51) Int. Cl.
*G06F 3/023* (2006.01)
*G06F 3/0354* (2013.01)

(52) U.S. Cl.
CPC .......... *G06F 3/0235* (2013.01); *G06F 3/0236* (2013.01); *G06F 3/03547* (2013.01)

(58) Field of Classification Search
CPC ... G06F 3/0235; G06F 3/03547; G06F 3/0236
See application file for complete search history.

(56) References Cited

U.S. PATENT DOCUMENTS

| | | | |
|---|---|---|---|
| 2008/0048997 A1* | 2/2008 | Gillespie | G06F 3/03547 345/174 |
| 2008/0100477 A1* | 5/2008 | Laufkotter | G06F 3/0235 341/23 |
| 2008/0136679 A1* | 6/2008 | Newman | G06F 3/017 341/20 |
| 2008/0136682 A1* | 6/2008 | Kandogan | G06F 3/0233 341/22 |
| 2009/0239517 A1* | 9/2009 | Ota | G06F 3/0233 455/418 |

* cited by examiner

*Primary Examiner* — Amine Benlagsir
(74) *Attorney, Agent, or Firm* — Venable LLP (57) ABSTRACT

A method for processing user input entered via a data entry system includes the steps of receiving a signal representative of a contact of one or more fingers singly or in combination against an arbitrary surface; detecting a predetermined number of contacts within a time window; and mapping the predetermined number of contacts to a secondary character from a set of secondary characters.

20 Claims, 8 Drawing Sheets

Prior Art

TAP DEVICE WITH MULTI-TAP FEATURE FOR EXPANDED CHARACTER SET

CROSS-REFERENCE TO RELATED APPLICATION

This application claims priority to U.S. Provisional Application No. 62/490,873 filed Apr. 27, 2017, the contents of which are incorporated herein by reference.

BACKGROUND

Field

Example aspects described herein related generally to chorded data entry systems, and more particularly to a tap device for entry of an expanded character set.

Description of Related Art

Figure 1:
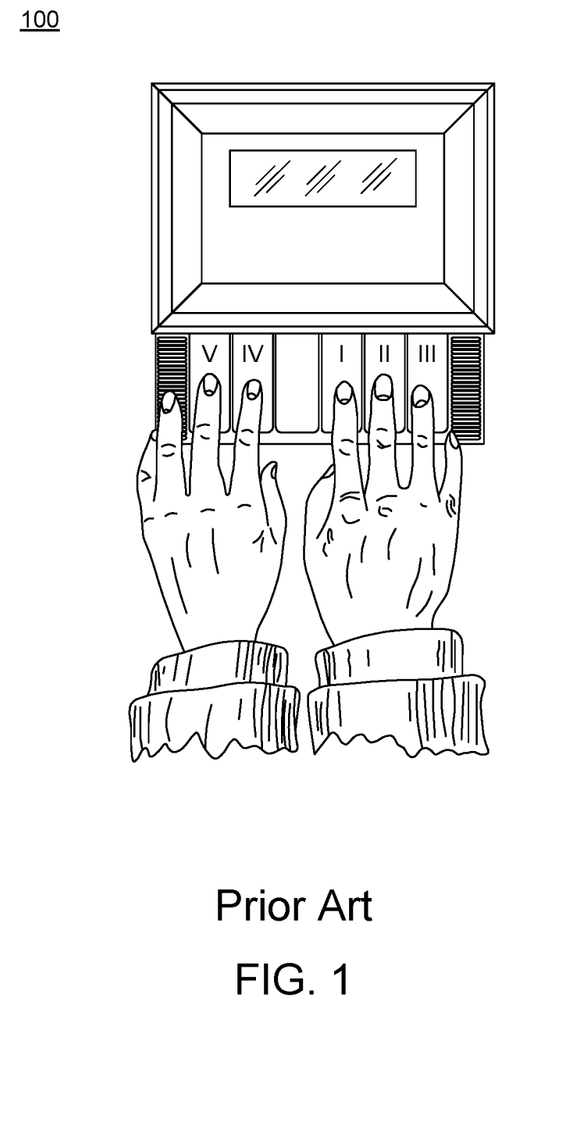
FIG. 1 illustrates an example of a Baudot Keyboard.

Even before the invention of the typewriter in 1868, efforts have been made to use finger combinations in a "chorded" arrangement to enter alphanumeric information. FIG. 1 shows an example of a Baudot Keyboard 100, the earliest five key chorded arrangement, which was invented in 1870 by Jean-Maurice-Emile Baudot as a five key alphanumeric entry system for telegraph operators. Using only five keys, the operator could enter 32 unique 'codes', which were mapped to corresponding alphanumeric symbols. Such codes were sometimes referred to as Baudot Codes, the precursor of ASCII codes and the source of the term "baud."

Other common examples of chorded keyboards are stenographic keyboards, which typically include 22 keys, and Braille keyboards, which typically include six or eight keys.

With the advent of computers, a number of attempts have been made to use chorded keyboards (sometimes referred to as "keyers") for single-handed data entry.

Touch screens have allowed "soft" keyboards to be incorporated into mobile devices. In addition to standard alphanumeric keyboards, a number of attempts have been made to create chorded keyboards using touch screen systems. While the above devices provide one-handed methods for character entry, they all require that the operator contact a specific point, or set of points, with a specific finger, or set of fingers. This "aiming" requirement significantly reduces the speed and ease with which data can be entered.

A different strategy is employed by gesture-based systems, which enable an operator to enter data (and "point") on a computer or mobile device without employing a standard keyboard. In this context, a gesture is a motion, sensed by a computer, whereby a user moves a hand or finger from a starting point to an end point.

While gesture-based systems enable a user to enter characters without having to aim for a specific point, typically they require that the motion have a trajectory from a certain starting point to a certain ending point. Thus, to create a gesture, the user must necessarily travel a minimum distance from one point to another. This is unlike a typical physical keyboard, where the only data that must be derived is based on which key is pressed. Because of this, gesture-based systems are significantly slower than physical keyboards.

A chorded data entry device (also referred to herein as a "tap keyboard") is an input device that allows a user to enter characters or commands that are formed by pressing several keys together, like playing a "chord" on a piano. The large number of combinations available from a small number of keys allows text or commands to be entered with one hand, leaving the other hand free. Such devices can be in the form of a chorded keyboard as described, for example, in U.S. patent application Ser. No. 15/055,853, filed Feb. 29, 2016, which is incorporated by reference herein. Such a chorded data entry device collects mechanical or optical information each time one or more fingers taps a surface and the tap signals are, in turn, decoded to correlate finger combinations into data.

In a chorded data entry device such as described in U.S. patent application Ser. No. 15/055,853, one hand can form 31 unique tap combinations. This is sufficient to cover the basic character set of most western languages. However, in order to provide a practical system for alphanumeric communication, a chorded data entry device is needed that allows the user to easily enter many more commands in order to enter punctuation, numbers, control commands and other data.

SUMMARY

In accordance with example aspects herein, the foregoing shortcomings are overcome by a novel, one-handed, chorded data entry system that enables an operator to tap a combination of fingers on a surface, thereby causing a character to be entered in an electronic device. The system allows the operator to tap on any surface, with the fingers arranged in any position. Neither the fingers nor the fingertips of the operator need be aimed at any target. As a result, the system described herein reduces finger travel and facilitates much faster and more accurate data entry than the prior systems.

In one embodiment, a data entry system includes a sensor apparatus constructed to generate a signal representative of a contact of one or more fingers singly or in combination against an arbitrary surface. The arbitrary surface does not generate the signal.

The contact of one or more fingers may represent a finger combination that maps to any one of a character and a command, or a combination of both the character and the command.

The data entry system can also include a wearable structure constructed to support the sensor apparatus on any one of i) a dorsal surface of a hand ii) a palmar surface of a hand, iii) a wrist, and iv) phalanges of a hand, or any combination of i), ii), iii) and iv).

In another embodiment, the data entry system further includes a memory. and the sensor apparatus further includes an image sensor arranged to acquire the signal, the signal being an image of the one or more fingers. The memory is operable to store the image.

The data entry system may also include a processor, communicatively coupled to the sensor apparatus, operable to filter the image to ascertain a location of each finger at the moment of contact against the arbitrary surface.

In yet another embodiment, the sensor apparatus further includes at least one mechanical sensor arranged to acquire the signal, the signal corresponding to a mechanical quantity caused by the one or more fingers contacting the arbitrary surface.

The data entry system may also include a processor operable to collect the signal received from the sensor apparatus at the moment of the contact against the surface.

A data entry method is also provided including the steps of generating a signal representative of a contact of one or more fingers singly or in combination against an arbitrary surface. The arbitrary surface does not generate the signal.

The data entry method can also include mapping a finger combination that is represented by the contact of the one or more fingers represents to any one of a character and a command, or a combination of both the character and the command.

In one embodiment, the data entry method can also include acquiring the image signal by an image sensor, the signal being an image of the one or more fingers, and storing the image in a memory.

The data entry method may also perform filtering the image to ascertain a location of each finger at the moment of contact against the arbitrary surface.

In yet another embodiment, the data entry method can include acquiring the signal, by at least one mechanical sensor, the signal corresponding to a mechanical quantity caused by the one or more fingers contacting the arbitrary surface.

The data entry method may further include collecting the signal received from the sensor apparatus at the moment of the contact against the surface.

In yet another aspect, a non-transitory computer readable storage medium storing a computer program which when executed by a computer causes the computer to execute a method of data entry according to the methods described herein Further features and advantages, as well as the structure and operation, of various example embodiments of the present invention are described in detail below with reference to the accompanying drawings.

BRIEF DESCRIPTION OF THE DRAWINGS

The features and advantages of the example embodiments presented herein will become more apparent from the detailed description set forth below when taken in conjunction with the drawings.

DETAILED DESCRIPTION

The example embodiments of the invention presented herein are directed to methods, systems and computer program products for a chorded data entry system that enables an operator to tap a combination of fingers on an arbitrary surface thereby causing a character or command to be entered in an electronic device, which are now described herein in terms of example one-handed chorded data entry systems. This description is not intended to limit the application of the example embodiments presented herein to one-handed use cases. In fact, after reading the following description it will be apparent to one skilled in the relevant art(s) how to implement all of the following example embodiments using a pair of the chorded data entry systems for use with an operator's left hand, right hand, or a combination of both. In addition, the term "finger combination" as used herein refers to any one finger or a combination of fingers.

The example chorded data systems described herein allow an operator's fingers to be arranged in any position and neither the fingers nor their fingertips need be aimed at any particular target. As a result, the system reduces finger travel and facilitates fast and accurate data entry. In addition, the system enables a user to enter characters or commands into a computing device by tapping a combination of fingers on any surface.

Figure 2:
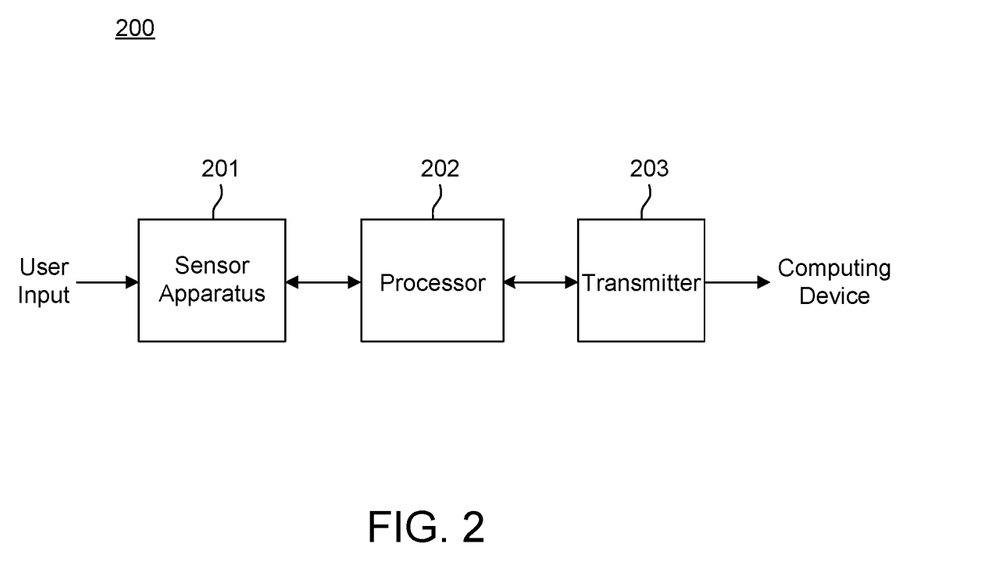
FIG. 2 illustrates an example system that may be employed in accordance with various example aspects herein.

FIG. 2 illustrates an example system 200 that may be employed in accordance with various example aspects. System 200 includes a sensor apparatus 201 that is coupled to a processor 202 which in turn is coupled to a transmitter 203.

In some example implementations sensor apparatus 201 may be integrated into a wearable structure such that the sensor apparatus 201 is located at the bottom of a wrist or palm of a user (also commonly referred to as the dorsal surface of a hand or palmar surface of a hand, respectively). In this embodiment, sensor apparatus 201 is arranged in a manner that allows all of the fingertips of the user to be within its field of view. The other components of system 200 including the processor 202 and transmitter 203 can be located elsewhere or inside on the housing or structure supporting the sensor apparatus 201.

In one embodiment, as sensor apparatus 201 captures finger combinations being used with each tap, processor 202 performs instructions which cause the sensed finger combination to be mapped to an appropriate character or command. The transmitter 203 then transmits the mapped or decoded character to a computing device via a wireless or wired interface.

Instead of determining finger combinations within system 200 by processor 202, in an alternative embodiment, processor 202 causes the image data obtained from the sensor apparatus 201 to be transmitted to the computing device for further processing (i.e., to process and filter the images, determine sensed finger combinations and map the sensed finger combinations to the appropriate character) via a wireless or wired interface. This would allow, for example, for the processing device of the computing device (e.g., in a smartphone or other computing device) to determine which fingertips were in contact with a surface during the tap, and which were not. Such an arrangement can reduce the complexity and power requirement of processor 202.

In yet another alternative embodiment, processor 202 performs some processing on the captured finger combinations, such as by performing edge detection filtering and landmark identification from the image data acquired by the sensor apparatus 201, and then forwarding the partially processed data through the transmitter to the computing device via a wireless or wired interface for further processing by the computing device and identification of the tapped finger combination.

The sensor apparatus 201 need only detect which fingers are in contact with the surface at the time of the tap, thereby allowing the user to tap on any surface, with fingers arranged in any position. The user need not aim at a specific key or location, or start the tap from a specific point (unlike in a gesture-based system), thus making the data entry process fast and reliable. Also, system 200 is mobile because tapping can be done on any surface, such as a table, a leg of the user, a chair, and/or the like.

Sensor apparatus 201 may optionally include a module, such as a mechanical sensor (e.g. accelerometers, vibration sensors, tactile sensors, force sensors, pressure sensors, gyroscopes, and the like), for sensing when a tap occurs (i.e. when any of the fingers of the hand have generated an acceleration, vibration, pressure or force indicative that they have made contact with a surface). In an example embodiment, processor 202 senses that a tap has occurred by reading the mechanical sensor, at which point the camera captures an image (or a series of images), and the processor 202 determines which fingertips were in contact with a surface during the tap, and which were not.

In an example embodiment, system 200 monitors the output of the mechanical sensor. The beginning of a tap event, in this situation, is indicated by a change in output from one or more mechanical sensor above a predetermined threshold. Once a tap is sensed, processor 202 causes an image sensor (discussed in more detail below) to capture image(s).

Figure 3:
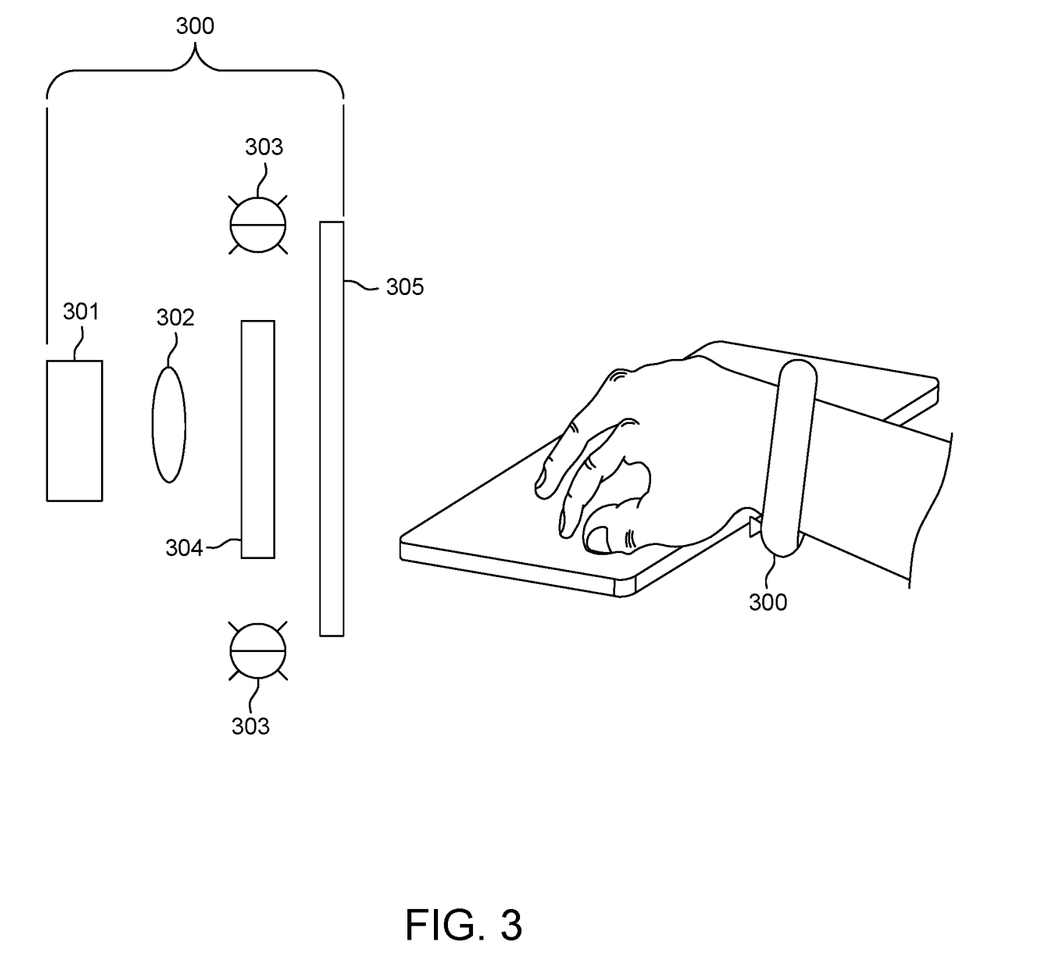
FIG. 3 illustrates an example of a camera-based sensor apparatus.

FIG. 3 illustrates an example camera-based sensor apparatus 300, or camera, which, in some example embodiments may further represent the sensor apparatus 201 that is described above in connection with FIG. 2. In one embodiment, sensor apparatus 300 includes an image sensor 301 which is sensitive to light in the near infrared spectrum, with associated drive electronics and image processing means (not shown), and a wide angle lens 302 arranged such that all five fingers are in its field of view. The image sensor 301 generates a signal representative of the image it captures.

Sensor apparatus 300 can also include an optical illumination system including one or more infrared light emitting diodes (IR LEDs) 303 which are strobed. In one embodiment, IR LEDs 303 are strobed in synchronization with the image sensor 301 or are illuminated whenever the device is turned on. In another embodiment IR LEDs 303 are strobed when a tap is detected.

An optical filter 304 is situated in front of image sensor 301 to prevent light having wavelengths that are below the infrared spectrum (e.g. 800 nm) from impinging on image sensor 301. Sensor apparatus 300 may also include a polarizing filter 305 placed in front of the IR LEDs 303 and lens 302, thus reducing the amount of ambient light that reaches the image sensor 301.

In this example implementation, as shown in FIG. 3, sensor apparatus 300 is implemented by attaching at least the sensor apparatus 300 to the bottom of a wrist of a user, arranged in a manner such that all of the fingertips of the user are within its field of view. As noted above in connection with FIG. 2, sensor apparatus 300 also can be implemented at other locations, such as by locating the sensor apparatus 300 at the bottom of a palm of a user.

Figure 4:
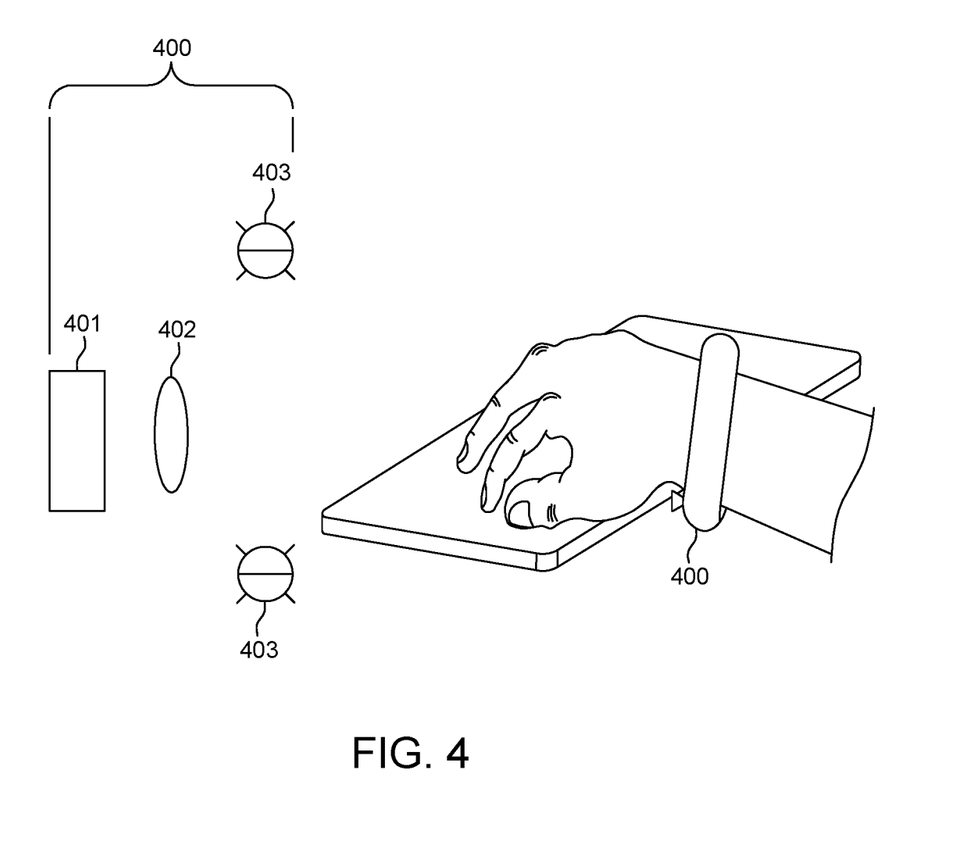
FIG. 4 illustrates another example of a camera-based sensor apparatus.

Referring to FIG. 4, in another embodiment, the optical illumination system can operate in the visible light spectrum (e.g., 400-700 nm). This embodiment is similar to the above described IR embodiments; however the illumination system emits light in the visible spectrum instead of the infrared spectrum. FIG. 4 illustrates an example camera-based sensor apparatus 400, or camera, which, in some example embodiments may further represent the sensor apparatus 201 that is described above in connection with FIG. 2. In this embodiment, the sensor apparatus 400 includes an image sensor 401 which is sensitive to light in the visible spectrum, with associated drive electronics and image processing means (not shown), and a wide angle lens 402 arranged such that all five fingers will be in its field of view. Sensor apparatus 400 can also include an optical illumination system. The illumination system includes one or more visible light-emitting diodes (LEDs) 403 which are strobed. In one embodiment, LEDs 403 are strobed in synchronization with the image 401. In another embodiment, LEDs 403 are strobed when a tap is detected.

In this example implementation, as shown in FIG. 4, sensor apparatus 400 is implemented by attaching at least the sensor apparatus 400 to the bottom of a wrist of a user, arranged in a manner such that all of the fingertips of the user are within its field of view. As noted above in connection with FIG. 2, sensor apparatus 400 also can be implemented at other locations, such as by way of the sensor apparatus 301 (or camera) located at the bottom of a palm of a user.

Alternatively, the illumination system is optional and the camera may utilize ambient light to acquire the image. In this embodiment, visible light emitting diodes 403 are thus not incorporated in sensor apparatus 400. Optionally, the illumination system can still be included (e.g., by including visible light emitting diodes 403) but the visible light diodes 403 can be left turned off when the ambient light is sufficient to acquire the image of the finger combination. In this optional embodiment, image sensor 401 can be used to sense the ambient light level and processor 202 (FIG. 2) can be used to determine whether there is sufficient light and to control visible light-emitting diodes 403 by strobing them when necessary.

In yet another embodiment, the sensor apparatus (i.e., the camera) can be a stereoscopic camera. This embodiment is similar to the embodiments discussed above in connection with FIGS. 2-4, except that the camera consists of two image sensors and two lenses, disposed relatively close to one another. When a tap is sensed, both image sensors simultaneously acquire images of the fingers at slightly different perspectives. In this embodiment the images captured by the image sensors are processed to determine landmarks in the two images to produce a single pseudo-three-dimensional image. This compound image is then further analyzed to determine which finger combination has been tapped as in the above embodiments.

Alternatively, the camera discussed above in connection with FIGS. 2-4 can be a time-of-flight type camera. In this embodiment, a single image sensor is used. In addition to capturing a two-dimensional image, the sensor apparatus (or camera) also records three-dimensional depth information. This compound image is further processed to determine which finger combination has been tapped.

In some example embodiments, one or more hardware components (e.g., components 201, 202, and/or 203 (FIG. 3), and/or components 301, 302, 303, 304 or 305 (FIG. 3) or 401, 402 and/or 403 (FIG. 4)) can be incorporated into another computing device. For instance, the components may be integrated into a smart watch, wearable glasses, another type of wearable device, or the like.

Alternatively, the components may be integrated into a desktop computer, laptop computer, tablet computer, or computer screen in which case the sensor apparatus can be, for example, of a form similar to that of the sensor apparatus 300 or 400 described above, but with at least the sensor apparatus and processor (e.g., processor 202) being housed in a device that is not worn by the user (e.g., a desktop, laptop, or tablet computer).

In yet another example embodiment, the sensing apparatus (e.g., component 201, 300, and/or 400) and processor (e.g., component 202) are not worn on the body of the user, but instead are remote from the user. For example, in a classroom or office, the sensor apparatus and processor may be installed in a centralized fixture, and tap data may be communicated by a transmitter (e.g., transmitter 203) in the centralized fixture to respective computing devices being operated by multiple users in the room. One example embodiment of such a system employs a stereoscopic camera and an IR illumination system, such as a scanning IR laser, that work together to capture images and determine the movements of users throughout the room.

Feature extraction software is then employed to identify within the field of view each user and their respective hand and finger locations. For example, after a user activates their respective computing device, the camera or imaging system of the centralized fixture identifies the finger positions of the user. Accuracy of the sensed finger positions can be enhanced by utilizing the IR illumination system. The fixture acquires the finger positions using the IR laser, and acquires images of each finger as it is illuminated by the laser. The processor of the fixture determines as each tap is performed whether each of the involved fingers is in contact with the surface when the tap is sensed, and then uses a mapping (e.g., as described in further detail below) to determine which character or command was input. A transmitter (e.g., component 203) of the fixture then transmits to the computing device of the associated user a message representing the appropriate character.

Figure 5:
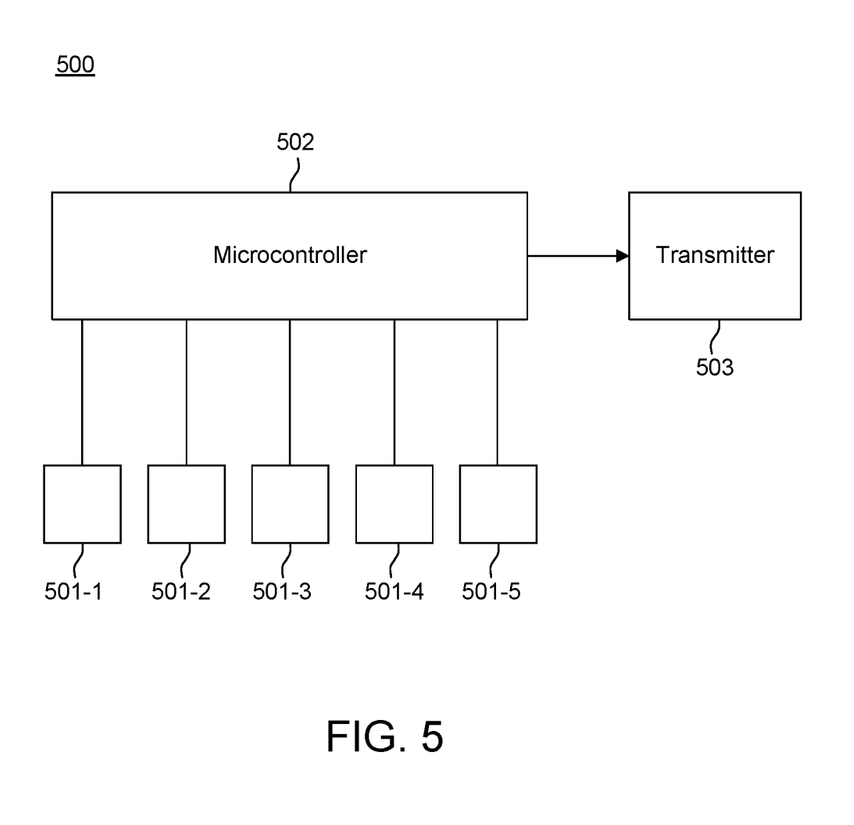
FIG. 5 illustrates another system that may be employed in accordance with example embodiments herein.

FIG. 5 illustrates another example system 500 that may be employed in accordance with example embodiments herein. This example embodiment employs mechanical sensors 501-1, 501-2, 501-3, 501-4, and 501-5 (collectively, 501), such as accelerometers, vibration sensors, tactile sensors, force sensors, pressure sensors, gyroscopes, and the like, to sense the mechanical quantities associated with corresponding fingers such as acceleration, vibration, force, pressure and the like. When, for example, a sudden change in mechanical quantity such as acceleration, vibration, force, pressure and the like, is sensed by any one or more of the sensors 501, a microcontroller 502 reads the output of the respective sensor(s) 501 and processes this information.

It should be understood that microcontroller 502 can include a processor such as the processor 202 discussed above with respect to FIG. 2. In addition, instead of using a microcontroller having input ports (e.g., analog-to-digital inputs ports), a processor in conjunction with similar peripheral integrated circuitry can be used (e.g., an analog-to-digital integrated circuit) and still be within the scope of the invention. Similarly, processor 202 discussed above in connection with FIG. 2 can be replaced with a microcontroller and still be within the scope of the invention.

In this embodiment, the sensors 501 are worn in such a way that each sensor 501 is in contact with a respective finger of a hand.

In this example embodiment, system 500 monitors the outputs of sensor 501. The beginning of a tap event, in this situation, is indicated by a change in output from any of the sensors 501 above a pre-determined threshold.

Once a tap event is sensed, microcontroller 502 reads data corresponding to each of the sensors 501 for a predetermined period of time (e.g. 60 ms), and analyzes the data to determine which of the fingers associated with the sensors 501 has made contact with a surface (resulting in a sensed finger combination). The microcontroller 502 then selects the character associated with the sensed finger combination and causes a transmitter 503 to transmit the character to a computing device.

In an example embodiment, microcontroller 502 sends the raw data from the sensors to a smartphone or other computing device, and the procedure of analyzing the raw data to determine which finger combination has been tapped may be performed within the smartphone or computing device.

Alternatively, the processor 502 extracts certain features from the raw data, such as peak amplitude, pulse width, rise time, time of arrival or (in the frequency domain) the power density for each of the sensors 501. Such feature information may be transmitted to a smartphone or other device with computing means. Further analysis of these features would then be performed within the smartphone or other computing means to determine the finger tap combination.

Figure 6:
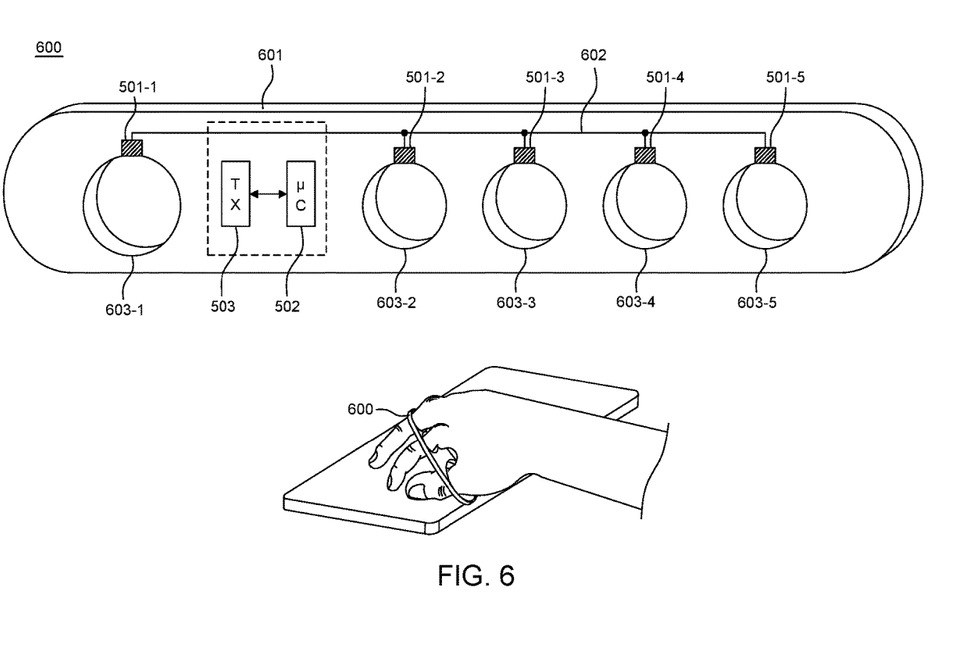
FIG. 6 illustrates an example mechanical sensor apparatus.

FIG. 6 illustrates an example sensor apparatus 600, which may further represent the sensor apparatus 500 that is described above in connection with FIG. 5. As shown in FIG. 6, mechanical sensors 501 (e.g., such as accelerometers, vibration sensors, tactile sensors, force sensors, pressure sensors, gyroscopes, and the like) are integrated inside the sensor apparatus 600, which in this example embodiment is in the form of a finger separator 601 that is flexible. The sensors 501 are located in the sensor apparatus 600 such that each sensor 501-1, 501-2, 501-3, 501-4, 501-5 is substantially in contact with a respective finger that is inserted within each finger hole 603-1, 603-2, 603-3, 603-4, 603-5 of finger separator 601 along the proximal phalanges (e.g., one sensor per proximal phalanx). Optionally, the sensor apparatus 600 can be constructed so as to house processor 502 and/or transmitter 503 as well, as shown in FIG. 6. Other components (e.g., power circuitry) can be integrated within the sensor apparatus 600 as well. The sensors 501 can be connected to the processor 502 via a bus placed within the structure of the finger separator 601. Alternatively, just the sensors 501 can be housed within the sensor apparatus 600 and connected via a connector (not shown) to the processor 502 and transmitter 503.

In yet another embodiment, just the sensors 501 and processor 502 can be housed (or encased) within the sensor apparatus 600 and connected to a remote transmitter 503 through a connector (not shown). It should be understood that the sensors 501 can be incorporated into a form factor other than the finger separator form factor shown in FIG. 6 and still be within the scope of the invention. Indeed, the form factor can be tailored to different ergonomics for different sizes and shapes of fingers and/or hands as will now be described.

This could be accomplished by incorporating the sensors 501 into a glove (or fingerless glove), so that each sensor 501 is in contact with one of the fingers along the phalanges. Alternatively, the sensors 501 could be worn across the back of the palm, so that the sensors 501 are in contact with the fingers along the metacarpal bones of each finger.

System 500 can be integrated into a variety of wearable structures. In another example embodiment, one or more system 500 components, for example, mechanical sensors 501, are incorporated into a flexible piece of fabric, such as a wearable wristband which can further be wrapped around the fingers or palm (fiducial marks), and operate in manners similar to those described in the context of the various example embodiments described elsewhere herein. The fabric may be comprised of elastic or another flexible material, in which the circuitry of the system 500 components is incorporated using flexible circuit technology. The fabric may be worn by the user by being wrapped around the user's hand, wrist, or other body part, which the user may move to cause particular characters to be transmitted or inputted to a computing device. In this embodiment, several mechanical sensors can be arranged within the layers of the material such that one or more mechanical sensors measures a mechanical quantity associated with a corresponding finger when the finger is tapped against a surface.

In another embodiment, the sensor apparatus 501 may be one or more acoustic sensors each of which senses the sound waves produced when each finger contacts the surface. In such a configuration, a single sensor or a multiplicity of sensors can be arranged to sense the acoustic signals produced by each tap. The processing means analyzes these signals to determine which of the fingers contributed to the acoustic signal in order to determine which finger combination was tapped.

In another embodiment, one or more EMG (electromyography) sensors may be employed. In this embodiment, sensors are in contact with the hand, wrist or arm of the user, and sense the electrical signals which are produced by the movement of the fingers and hand. Such a device may also employ a vibration sensor or accelerometer to sense a tap event. When a tap occurs the processor analyzes the signals from the EMG sensors to calculate the relative position of the fingers in order to determine which tap combination has been produced.

In another embodiment, Radio Frequency waves may be employed to determine the relative location of the fingers. In this embodiment, one or more RF sources produce a brief signal, and a multiplicity of sensors measures the pattern of reflection of such signal. By analyzing the reflection pattern, the location of the fingers is calculated and the tap combination is determined.

In another embodiment, processor 202 (FIG. 2) can be used instead of microcontroller 502 or conversely microcontroller 502 can be used instead of processor 202. Additionally, both systems 200 and 500 and their respective implementations can be combined. In this embodiment, placement of the camera-based sensor apparatus 201 and mechanical sensors 501 can be arranged as described herein.

Figure 7:
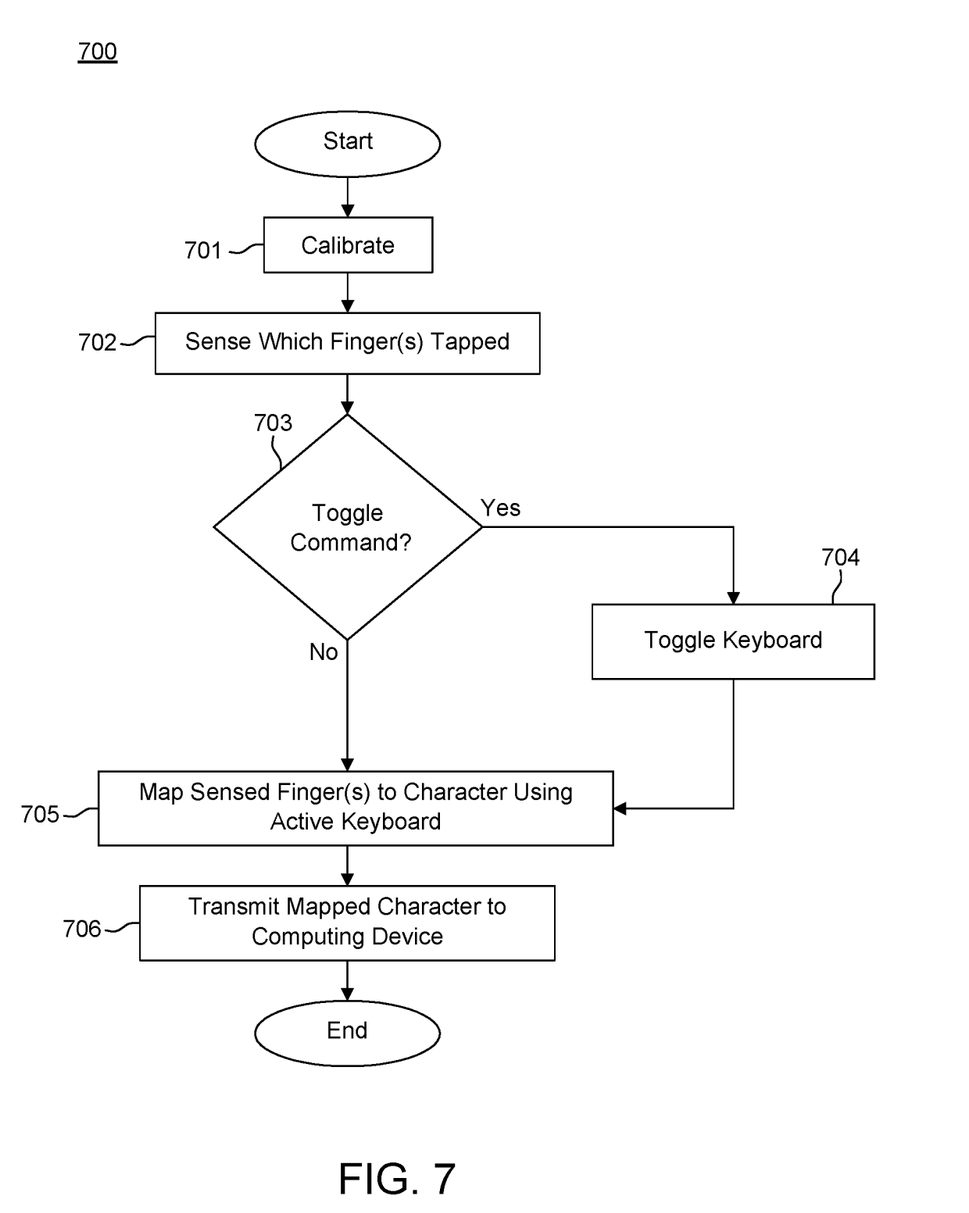
FIG. 7 is a flowchart illustrating an example procedure that may be employed according to various example embodiments herein.

Having described example systems that may be employed in accordance with various example aspects herein, reference will now be made to FIG. 7 to describe an example procedure 700 that may employ such systems.

At block 701, an optional calibration procedure is employed in order to speed and simplify processing, and to make the detection process more robust. To do this, a reference signal is first generated by tapping all of the fingers of a hand on a surface, enabling capture and processing of a corresponding reference signal. Since it is known that the reference tap is performed with all fingers in contact with the surface, the calibrated signal would serve as a reference signal that represents the signal produced by the sensor in a situation in which each of the fingers is in contact with the surface. The device can employ the reference signal as the basis for interpreting future taps, for instance by determining whether any given fingertip is present in any of the reference "down" positions.

The image sensor apparatus system 200 discussed above in connection with FIGS. 2-4 can be employed to acquire a reference signal. In instances where the sensor apparatus is as discussed above, the reference signal is an image which presents the position of each of the fingers when they are in the 'tap' position. This reference image can be compared to subsequently acquired images to determine which fingers are shown to be in the 'tap' position or the 'no tap' position.

The mechanical sensor apparatus system 500 discussed above in connection with FIGS. 5 and 6 can also be employed in a manner to acquire a reference signal. In such an embodiment, the signals acquired from the sensors from the reference 'tap' are analyzed and features are extracted from the sensors 501 of each finger which represent the signals produced when each of the fingers contacts the surface. This information can be compared with subsequent signals from subsequent tap events to distinguish which fingers have contacted the surface and which have not.

At block 702, a tap is sensed and a determination is made as to which finger combination was employed during the tap. In the camera implementation, when the tap occurs, an image (or sequence of images) of the fingers is acquired and stored in a memory. In the mechanical sensor embodiment, the forces of each mechanical sensor measurement is acquired and stored in a memory. A processor (e.g., processor 202 or 502) then executes a series of filter algorithms on the acquired images to ascertain the locations of the fingertips during the tap. For example, the processor may first execute an edge detection algorithm, such as a Canny Filter, on the acquired image. The result of such a procedure may include a table of pixel locations of the lowest part of each fingertip within the image.

At block 703 a determination is made (e.g., by processor 202 or 502) based on the sensed finger combination and the mapping provided by the presently active keyboard, whether the sensed finger combination corresponds to a toggle command. If the processor determines that the sensed finger combination does not correspond to the toggle command, then control is passed to block 705. If, on the other hand, a determination is made in block 703 that the sensed finger combination does correspond to the toggle command, then at block 704 the processor toggles the keyboard, activating either the default keyboard or the alternate keyboard based on which one of the keyboards is presently active. Control is then passed to block 705.

Once a determination has been made as to which fingers were in contact with the surface during the tap, the character corresponding to that finger combination is calculated based on a look-up table. In particular, at block 705, the mapping provided by the active keyboard (e.g., the default keyboard or the alternate keyboard, as shown for example in Table 1 (below), which in some example embodiments is pre-stored in memory) is employed to map the sensed finger combination to a corresponding character (a mapped or decoded character).

At block 706, the processor causes the transmitter to transmit the mapped or decoded character to the computing device (e.g., a mobile or desktop computing device) by way of a wired or wireless interface. At that point, the system can optionally return to the low-power mode until a next tap event is detected.

Figure 8:
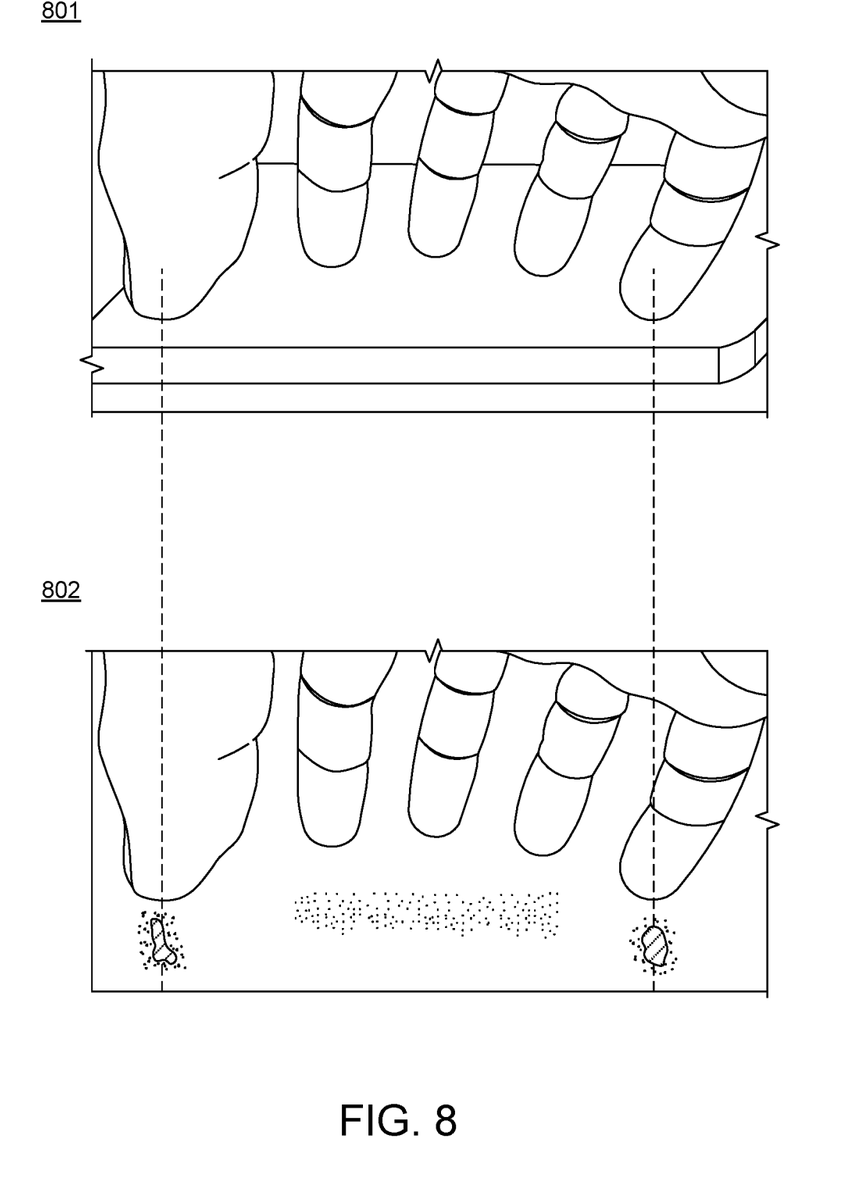
FIG. 8 illustrates an example of an acquired image and a corresponding edge-detected image in accordance with various example aspects herein.

FIG. 8 illustrates an example acquired image 801 and a corresponding edge-detected image 802 that may result from executing the above-described procedure. The processor applies a feature extraction algorithm, such as a Hough Transform, to the edge-detected image in order to identify the finger combination of the tap. The fingertips, in one example, are modeled as simple circles (or semi-circles) for the Hough Transform. In this manner, the feature extraction process is simplified because of the a priori knowledge of the morphology of the hand, i.e., that there are five fingers, and that the fingers are arranged vertically throughout the image.

Using the five fingers of one hand, a user can tap 31 unique finger combinations. These finger combinations are mapped to standard ASCII characters. For example, in the English language, the 31 finger combinations would suffice to represent the 26 letters of the alphabet, and the five remaining combinations could be used to represent common "control" characters, such as SHIFT, RETURN, and BACKSPACE. As described below, one of the finger combinations would represent a "toggle" command, which would enable an alternate character set or sets. These alternate character sets can contain additional characters such as numbers, punctuation and other ASCII characters.

As described above, the processor need not determine which of the fingertips were in contact with the surface (i.e., perform the algorithm that maps the finger combinations to standard ASCII characters) and instead can cause the raw data to be transmitted to a computing device that is communicatively coupled with the processor (e.g., processor 202 or 502) through, for example, a transmitter (e.g., 203 or 503). This would allow for example for the processing device of the computing device (e.g., in a smartphone or other computing device) to determine which of the fingertips were in contact with a surface during the tap, and which were not.

Table 1 shows an example of how the printable ASCII characters and common control characters could be mapped into finger tap combinations. In particular, Table 1 shows which default keyboard character and which alternate keyboard character corresponds to each finger combination. Finger combinations are identified in the chart by a string of five characters corresponding to the five fingers, respectively, of a user's hand. For instance, the left-most one of the five characters may correspond to a user's thumb on their right hand or the user's pinky on their left hand, and so on. The right-most one of the five characters may correspond to a user's pinky on their right hand or their thumb on their left hand, and so on. In each finger combination an X represents a finger that is involved in a tap, and an O represents a finger that is not involved in the tap, thereby forming a binary number that can be mapped to different characters.

TABLE 1

CHARACTER MAP EXAMPLE

| FINGER COMBO. | DEFAULT KEYBOARD | | ALTERNATE KEYBOARD | |
|---|---|---|---|---|
| | No Shift | Shift | No Shift | Shift |
| 1 XOOOO | A | A | 1 | |
| 2 OXOOO | E | E | 2 | |
| 3 XXOOO | N | N | 6 | |
| 4 OOXOO | I | L | 3 | |
| 5 XOXOO | S | S | ? | |
| 6 OXXOO | T | T | 7 | |
| 7 XXXOO | SHIFT | SHIFT | SHIFT | |
| 8 OOOXO | O | O | 4 | |
| 9 XOOXO | K | K | , | |
| 10 OXOXO | M | M | ( | ) |
| 11 XXOXO | J | J | - | _ |
| 12 OOXXO | L | L | 8 | |
| 13 XOXXO | X | X | / | \ |
| 14 OXXXO | DELETE | DELETE | DELETE | |
| 15 XXXXO | R | R | . | |
| 16 OOOOX | U | U | 5 | |
| 17 XOOOX | Y | Y | ' | " |
| 18 OXOOX | G | G | : | |
| 19 XXOOX | B | B | ! | |
| 20 OOXOX | F | F | < | > |
| 21 XOXOX | W | W | # | * |
| 22 OXXOX | Q | Q | + | = |
| 23 XXXOX | Z | Z | ^ | ~ |
| 24 OOOXX | d | D | 9 | |
| 25 XOOXX | C | C | $ | % |
| 26 OXOXX | P | P | @ | & |
| 27 XXOXX | V | V | [ | ] |
| 28 OOXXX | TOGGLE | TOGGLE | TOGGLE | |
| 29 XOXXX | RETURN | RETURN | RETURN | |
| 30 OXXXX | H | H | 0 | |
| 31 XXXXX | SPACE | SPACE | SPACE | |

For convenience, the following example is provided in a case where a user's right hand is being employed for taps. At the start, a default keyboard (or character set) is active. As one example, to tap the letter "a," the user may momentarily tap their thumb on a surface, in which case a sensor apparatus determines that the thumb had been in contact with the surface at the moment of the tap, and the letter "a" is transmitted to the computing device. To tap a capital "A," the user would first tap with their thumb, first, and middle fingers simultaneously on a surface. This would be interpreted by the sensor apparatus and/or processor as the "SHIFT" command. Then, the user would tap the "A" as before, with their thumb.

As mentioned above, to activate an alternate keyboard, for instance to facilitate selection of a special character, the user would first tap the "TOGGLE" command, using the middle, ring and pinky fingers. This would activate the alternate keyboard. The user could then tap the finger combination that corresponds to the number or character desired. Note that by using the TOGGLE command in conjunction with other combinations, any number of alternative keyboards can be selected.

In one example embodiment herein, to increase the ease and speed by which a user can be trained to employ a particular mapping of finger combinations to characters, finger combinations can be categorized into finger sets, or categories of finger combinations that share similar characteristics. For instance, Table 2 shows example categories or finger sets.

TABLE 2

| Finger Set (Number of possible combinations) | Possible Finger Combinations |
|---|---|
| All Fingers Down (1) | XXXXX |
| One Finger Down (5) | X0000 |
| | 0X000 |
| | 00X00 |
| | 000X0 |
| | 0000X |
| One Finger Up (5) | 0XXXX |
| | X0XXX |
| | XX0XX |
| | XXX0X |
| | XXXX0 |
| Two Fingers, Together (4) | XX000 |
| | 0XX00 |
| | 00XX0 |
| | 000XX |
| Two Fingers, Skip One (3) | X0X00 |
| | 0X0X0 |
| | 00X0X |
| Two Fingers, Far Apart (3) | X000X |
| | X00X0 |
| | 0X00X |
| Three Fingers Together (3) | XXX00 |
| | 0XXX0 |
| | 00XXX |
| Three Fingers, Skip Two and Two Skips (3) | X00XX |
| | XX00X |
| | X0X0X |
| Three Fingers, Skip One (4) | X0XX0 (Thumb Down, First Up) |
| | XX0X0 (Thumb Down, Middle Down) |
| | 0X0XX (Pinky Down, Middle Down) |
| | 0XX0X (Pinky Down, Ring Up) |

By grouping finger combinations into sets, and then mapping a finger set to characters that share a common characteristic, a user may find it easier to learn to use the mapping for character entry. For example, there are five finger combinations possible in the set referred to as "one finger down." Those five finger combinations may be mapped to the five vowels of the English alphabet (i.e., a, e, i, o, and u), thereby making it easier for a user to employ such a mapping.

A chorded data entry device as described above allows one hand to form 31 unique tap combinations. This is sufficient to cover the basic character set of most western languages. As mentioned above, however, in order to provide a practical system for alphanumeric communication, it is desirable to have a chorded data entry device that allows the user to easily enter many more commands in order to enter punctuation, numbers, control commands and other data.

One method of accomplishing this is to designate one of the tap combinations as a 'switch' command, which enables a secondary character set or alternate keyboard (in the same manner as a soft keyboard does in a smartphone). The above-described "TOGGLE" command is an example of this approach. This is an effective method; however, it slows the data entry process because two taps must be used to enter a character in the secondary set.

A faster method is to allow the user to tap a single combination two or more times to send an alternate character. For example, in order to send the character 'parenthesis', the user could tap a combination which corresponds to the letter 'p' twice within a given time window. (As a further example, to send the character 'close parenthesis', the user would tap the combination which corresponds to the letter 'p' three times.) Although the user must tap more than once to produce these characters, data entry is speeded up because it is much faster to tap the same character again than to tap two different combinations.

In one preferred embodiment, the finger combinations are selected in such a manner that each combination corresponds to a letter which makes it easier to learn which punctuation mark it corresponds with. This can be done by selecting a letter which is prominent in the name of the punctuation mark or special character. For example:
MM=coMMa
K=question marK
E=Exclamation point
C=Colon
L=sLash An additional use for the multi tap system is to allow an easier entry of difficult tap combinations. Tap combinations which require that the user tap with their 3rd and 5th finger, but not allow their 4th finger to tap, are difficult for some users. In the example embodiment described above, there are four tap combinations which require this, and in an optimal system, they are mapped to the least used letters of the alphabet, (in English; j, z, q, w).

In another embodiment of the invention, the letters associated with the 'difficult' taps may also be entered with double taps of easier letters. This provides a 'shortcut' for novice users to learn how to tap these letters.

Multiple taps may also be used to send characters such as cursor controls, special key commands (such as escape and control), to send emoji and other specialty symbols, to enable different modes within the tap device or to turn the device on and off.

In one embodiment, the time window which is allowable for the user to enter a double tap is dynamically set based on the context of the language. This is important, since the system must accurately discriminate between times in which the user's intention is to enter a double letter or a double tap. In the preferred embodiment, three time windows are designated,
0=fast
1=medium
2=slow The following table is an example of the context rules for defining which time window is used:

|   |            | If at start of word | After Vowel | After Consonant |
|---|------------|---------------------|-------------|-----------------|
| A | V Shortcut | 2                   | 2           | 1               |
| B | [          | 2                   | 1           | 2               |
| C | :          | 1                   | 0           | 2               |
| E | !          | 2                   | 1           | 2               |
| G | >          | 2                   | 0           | 2               |
| H | -          | 2                   | 1           | 2               |
| I | J Shortcut | 2                   | 1           | 2               |
| K | ?          | 1                   | 1           | 2               |
| L | /          | 1                   | 0           | 2               |
| M | ,          | 1                   | 0           | 2               |
| O | Q Shortcut | 1                   | 2           | 0               |
| P | (          | 2                   | 0           | 2               |
| R | '          | 2                   | 0           | 2               |
| T | "          | 1                   | 0           | 2               |
| U | W Shortcut | 2                   | 2           | 0               |
| Y | Z Shortcut | 2                   | 1           | 2               |

As the table shows, the time window is dependent on two factors; the position of the tap within the word and whether the preceding letter is a vowel or consonant. In creating the table, the overall frequency of occurrence of the double letter combination is also considered. For example, the letters L and S have a relatively high probability of occurrence in English, while letters K and W are extremely rare.

By applying these rules, the system adapts the time window to the likelihood of the intention of the user. For example, if the user taps two consecutive p's at the start of a word, it is far more likely that the intention is to create a parenthesis character rather than to begin the word with 'pp', so as long as the taps are within the slow time window, the character is interpreted as a double tap. On the other hand, if the user taps two consecutive p's after a vowel, the likelihood that the intended character is 'pp' is more significant, so unless the user taps both characters within the fast time window, it is interpreted as a two p's. In this manner, the device can greatly improve the accuracy of discriminating between intended double letters and double taps that indicate alternative characters.

In another example, which is available to all the embodiments described herein, the sensor apparatus and/or other components are incorporated into a wearable device, and are configured to sense user motion in addition to finger taps. In response to such sensing, the wearable device may facilitate screen-navigation functions on a screen that is either incorporated into the wearable device or separate from the wearable device. In this manner, the device may utilize the sensed hand motions to control the location of a cursor on a computer screen, thus emulating the function of a mouse. In this situation, certain finger tap combinations can be mapped to common mouse commands (e.g. right click, left click).

The connectivity to a separate device can be according to Human Interface Device Profile (HID), which defines the protocols, procedures and features to be used by Bluetooth HID enabled devices such as keyboards, pointing devices, gaming devices and remote monitoring devices.

Alternatively, and/or additionally, the sensor apparatus within the wearable device can be configured to interpret gestures as well as taps. In this case, the device may be used to manipulate objects on a screen or send commands to a computing device.

As can be appreciated in view of the above, the example embodiments described herein provide a one-handed, chorded data entry system that enables an operator to tap a combination of fingers on a surface, thereby causing a character to be entered in an electronic device. Unlike previous systems, the system disclosed herein allows the user to tap on any surface, with the fingers arranged in any position. Also unlike previous systems, with this system neither the fingers nor the fingertips of the user need be aimed at any target. As a result, the system described herein reduces finger travel and facilitates fast and accurate data entry.

It should also be understood that the number of fingers required to map to a finger combination can be fewer than five. This embodiment would be useful, for example, in the case where a user's hand has fewer than five fingers due to, for example, an injury or disability.

Software embodiments of the example embodiments presented herein may be provided as a computer program product, or software, that may include an article of manufacture on a machine accessible or machine readable medium having instructions. The instructions on the non-transitory machine accessible machine readable or computer-readable medium may be used to program a computer system or other electronic device. The machine or computer-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "computer-readable", "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments have been described above, it should be understood that they have been presented by way of example, and not limitation. It is apparent to persons skilled in the relevant art(s) that various changes in form and detail can be made therein. Thus, the invention should not be limited by any of the above described example embodiments. Also, as used herein, the singular forms "a," "an," and "the," are intended to include the plural forms as well, unless the context clearly indicates otherwise.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures described herein need not be performed in the order presented.

What is claimed is:

1. A method for entering data using a data entry system having one or more sensors, comprising steps of:
   generating, using at least one of the one or more sensors, a first signal representative of a first contact combination, the first contact combination representing contact of one or more fingers of a user singly or in combination in a first arbitrary location against a first arbitrary surface, wherein the one or more sensors are separate from the first arbitrary surface and the first arbitrary surface does not generate the first signal;
   generating, using said at least one of the one or more sensors, a second signal representative of a second contact combination, the second contact combination representing contact of the one or more fingers of the user singly or in combination in a second arbitrary location against a second arbitrary surface after termination of the first contact combination, wherein the one or more sensors are separate from the second arbitrary surface and the second arbitrary surface does not generate the second signal; and
   analyzing the first signal representative of the first contact combination, generated using said at least one of the one or more sensors, and the second signal representative of the second contact combination, generated using said at least one of the one or more sensors, to determine whether the second contact combination occurs within a predetermined time window relative to the first contact combination;

if the second contact combination occurs within the predetermined time window and the second contact combination corresponds to a predetermined contact combination, map the first contact combination and the second combination collectively to a single secondary character from a set of secondary characters; and otherwise, map the first contact combination to a primary character from a set of primary characters and map the second contact combination to a separate primary character from the set of primary characters, wherein the one or more sensors comprise an image sensor and the first signal representative of the first contact combination is generated by capturing an image of the user's one or more fingers using the image sensor and analyzing the captured image to determine which of the one or more fingers contacted the first arbitrary surface.

2. The method according to claim 1, wherein the predetermined contact combination is the same as the first contact combination.

3. The method according to claim 2, wherein the predetermined time window has a variable length, and the method further comprises step of:

setting the variable length of the predetermined time window based on at least one of (i) a position of an alphanumeric character within a word, (ii) a preceding secondary character being a vowel or a consonant, (iii) a frequency of a plurality of uses of the single secondary character, and (iv) a combination of (i), (ii) and/or (iii).

4. The method according to claim 2, wherein the single secondary character is one of an emoji and a specialty symbol from the set of secondary characters.

5. The method according to claim 2, wherein the single secondary character corresponds to a command.

6. A data entry system, comprising:

a sensor apparatus having one or more sensors configured to generate a signal representative of contact of one or more fingers of a user singly or in combination in an arbitrary location against an arbitrary surface, wherein the one or more sensors are separate from the arbitrary surface and the arbitrary surface does not generate the signal;

a memory that stores information about a set of primary characters and a set of secondary characters;

a processor communicably coupled to the memory and the sensor apparatus, the processor being operable to:

process a first signal generated by the sensor apparatus representative of a first contact combination, the first contact combination representing contact of the one or more fingers singly or in combination in a first arbitrary location against a first arbitrary surface, and a second signal generated by the sensor apparatus representative of a second contact combination, the second contact combination representing contact of the one or more fingers singly or in combination in a second arbitrary location against a second arbitrary surface after termination of the first contact combination;

determine whether the second contact combination occurs within a predetermined time window relative to the first contact combination;

if the second contact combination occurs within the predetermined time window and the second contact combination corresponds to a predetermined contact combination, map the first contact combination and the second contact combination collectively to a single secondary character from the set of secondary characters; and otherwise, map the first contact combination to a primary character from the set of primary characters and map the second contact combination to a separate primary character from the set of primary characters, wherein the one or more sensors comprise an image sensor and the first signal representative of the first contact combination is generated by capturing an image of the user's one or more fingers using the image sensor and analyzing the captured image to determine which of the one or more fingers contacted the arbitrary surface.

7. The data entry system according to claim 6, wherein the predetermined contact combination is the same as the first contact combination.

8. The data entry system according to claim 7, wherein the processor is further operable to:

set a length of the predetermined time window based on at least one of (i) a position of an alphanumeric character within a word, (ii) a preceding secondary character being a vowel or a consonant, (iii) a frequency of a plurality of uses of the single secondary character, and (iv) a combination of (i), (ii) and/or (iii).

9. The data entry system according to claim 7, wherein the single secondary character is one of an emoji and a specialty symbol from the set of secondary characters.

10. The data entry system according to claim 7, wherein the single secondary character corresponds to a command.

11. The data entry system according to claim 6, wherein the image sensor is configured to be worn on one of the user's wrist, the user's palm, or a dorsal surface of the user's hand.

12. A non-transitory computer-readable storage medium storing a program for causing a processor to implement a method of entering data using a data entry system having one or more sensors, the method comprising steps of:

receiving a first signal generated using said at least one of the one or more sensors and representative of a first contact combination, the first contact combination representing contact of one or more fingers of a user singly or in combination in a first arbitrary location against a first arbitrary surface, wherein the one or more sensors are separate from the first arbitrary surface and the first arbitrary surface does not generate the first signal;

receiving a second signal generated using said at least one of the one or more sensors and representative of a second contact combination, the second contact combination representing contact of the one or more fingers of the user singly or in combination in a second arbitrary location against a second arbitrary surface after termination of the first contact combination, wherein the one or more sensors are separate from the second arbitrary surface and the second arbitrary surface does not generate the second signal; and analyzing the first signal representative of the first contact combination, generated using said at least one of the one or more sensors, and the second signal representative of the second contact combination, generated using said at least one of the one or more sensors, to determine whether the second contact combination occurs within a predetermined time window relative to the first contact combination;

if the second contact combination occurs within the predetermined time window and the second contact combination corresponds to a predetermined contact combination, map the first contact combination and the second combination collectively to a single secondary character from a set of secondary characters; and otherwise, map the first contact combination to a primary character from a set of primary characters and map the second contact combination to a separate primary character from the set of primary characters, wherein the one or more sensors comprise an image sensor and the first signal representative of the first contact combination is generated by capturing an image of the user's one or more fingers using the image sensor and analyzing the captured image to determine which of the one or more fingers contacted the first arbitrary surface.

13. The storage medium according to claim 12, wherein the predetermined contact combination is the same as the first contact combination.

14. The storage medium according to claim 13, wherein the method further comprises step of:

setting a length of the predetermined time window based on at least one of (i) a position of an alphanumeric character within a word, (ii) a preceding secondary character being a vowel or a consonant, (iii) a frequency of a plurality of uses of the single secondary character, and (iv) a combination of (i), (ii) and/or (iii).

15. The storage medium according to claim 13, wherein the single secondary character is one of an emoji and a specialty symbol from the set of secondary characters.

16. The storage medium according to claim 13, wherein the single secondary character corresponds to a command.

17. A method for entering data using a data entry system having one or more sensors, comprising steps of:

receiving signals generated using the one or more sensors and respectively representative of sequential contact combinations, each sequential contact combination representing contact of one or more fingers of a user singly or in combination in an arbitrary location against an arbitrary surface after termination of a prior contact combination, wherein the one or more sensors are separate from the arbitrary surface and the arbitrary surface does not generate the signals; and analyzing the signals representative of the sequential contact combinations generated using said at least one of the one or more sensors to determine whether a same sequential contact combination occurs consecutively a predetermined number of times within a predetermined time window;

if the same sequential contact combination occurs the predetermined number of times within the predetermined time window, map the predetermined number of times of the same sequential contact combination collectively to a single secondary character from a set of secondary characters; and otherwise, map each sequential contact combination to a separate primary character from a set of primary characters, wherein the one or more sensors comprise an image sensor and the received signals respectively representative of the sequential contact combinations are generated by capturing an image of the user's one or more fingers using the image sensor and analyzing the captured image to determine which of the one or more fingers contacted the arbitrary surface.

18. The method according to claim 17, wherein the predetermined number of times is two.

19. The method according to claim 17, wherein a length of the predetermined time window can be varied.

20. The method according to claim 19, wherein the length of the predetermined time window is set based on at least one of (i) a position of an alphanumeric character within a word, (ii) a preceding secondary character being a vowel or a consonant, (iii) a frequency of a plurality of uses of the single secondary character, and (iv) a combination of (i), (ii) and/or (iii).

* * * * *